(12) United States Patent
Sato

(10) Patent No.: US 8,195,024 B2
(45) Date of Patent: Jun. 5, 2012

(54) STREAM GENERATING APPARATUS, IMAGING APPARATUS, DATA PROCESSING APPARATUS AND STREAM GENERATING METHOD

(75) Inventor: Takayuki Sato, Kanagawa (JP)

(73) Assignee: Sony Corporation (JP)

( * ) Notice: Subject to any disclaimer, the term of this patent is extended or adjusted under 35 U.S.C. 154(b) by 1239 days.

(21) Appl. No.: 11/803,859

(22) Filed: May 15, 2007

(65) Prior Publication Data

US 2007/0269192 A1    Nov. 22, 2007

(30) Foreign Application Priority Data

May 17, 2006    (JP) .............................. P2006-137888

(51) Int. Cl.
*H04N 5/765* (2006.01)
(52) U.S. Cl. ......... 386/200; 386/351; 386/353; 386/357
(58) Field of Classification Search .................. 386/351, 386/353, 357
See application file for complete search history.

(56) References Cited

U.S. PATENT DOCUMENTS

| | | | |
|---|---|---|---|
| 2003/0021298 A1* | 1/2003 | Murakami et al. ............ | 370/535 |
| 2004/0131264 A1* | 7/2004 | Sakuyama et al. ............ | 382/233 |
| 2004/0141730 A1* | 7/2004 | Nishi et al. .................... | 386/109 |
| 2005/0076063 A1* | 4/2005 | Andoh .......................... | 707/200 |
| 2007/0142943 A1* | 6/2007 | Torrini et al. .................. | 700/94 |
| 2008/0317125 A1* | 12/2008 | Murakami et al. ........ | 375/240.12 |

FOREIGN PATENT DOCUMENTS

| | | |
|---|---|---|
| JP | 2002-033712 A | 1/2002 |
| JP | 2005176212 A | 6/2005 |
| JP | 2005318502 A | 11/2005 |
| JP | 2007158432 A | 6/2007 |

OTHER PUBLICATIONS

Office Action from Japanese Application No. 2006-137888, dated Sep. 14, 2010.
Office Action from Japanese Application No. 2006-137888, dated Apr. 26, 2011.

* cited by examiner

*Primary Examiner* — Thai Tran
*Assistant Examiner* — Jose Mesa
(74) *Attorney, Agent, or Firm* — Lerner, David, Littenberg, Krumholz & Mentlik, LLP

(57) ABSTRACT

There is provided stream generating apparatus which generates a multiplexed stream including moving picture data. The apparatus includes a moving picture encoding processing section for generating a moving picture stream by encoding the moving picture data allowing switching between a reference frame rate and more than one frame rate different from the reference frame rate according to a desired timing; a time control information generating section for generating playback time control information with certain intervals corresponding to picture frame display cycles relevant to the reference frame rate, for each picture frame inputted to the moving picture encoding processing section; and a multiplexing processing section for generating the multiplexed stream by multiplexing the moving picture stream and the playback time control information.

12 Claims, 6 Drawing Sheets

STREAM GENERATING APPARATUS, IMAGING APPARATUS, DATA PROCESSING APPARATUS AND STREAM GENERATING METHOD

CROSS-REFERENCE TO RELATED APPLICATION

The present application claims priority from Japanese Patent Application No. JP 2006-137888, filed in the Japanese Patent Office on May 17, 2006, the entire content of which is incorporated herein by reference.

BACKGROUND OF THE INVENTION

1. Field of the Invention

The present invention relates to a stream generating apparatus for generating a multiplexed stream including moving picture data, an imaging apparatus having a stream generating function of this type, a data processing apparatus for processing input data including the moving picture data, and a stream generating method. More particularly, the present invention relates to a stream generating apparatus, an imaging apparatus, a data processing apparatus and a stream generating method that all enable processing of moving picture data allowing frame rate switching.

2. Description of Related Art

In recent years, it is generally known to treat a moving picture as digital data, leading to a rapid spread of an imaging apparatus such as a digital video camera that may record an imaged moving picture as the digital data, and a digital recorder that may record a television broadcasting video etc. as the digital data. According to a moving picture compression/encoding scheme used in the apparatus of this type, time control information for playback output and decoding is generally multiplexed and recorded in a data stream together with compressed video data. For MPEG (Moving Picture Experts Group) system, for instance, playback time control information is referred to as PTS (Presentation Time Stamp), and is to be appended to a header of a packet including top data in a decoding/playback unit called an access unit.

By the way, with an advance of imaging device performances and signal processing technologies, the imaging apparatus such as the digital video camera is improved so as to permit the imaged picture to be outputted in a shorter period than a display cycle that meets existing television broadcasting standards, leading to a suggestion of an imaging apparatus provided with such a fast imaging function. For instance, there is one suggestion that specifies an imaging apparatus that enables slow-motion playback by applying a standard or normal frame rate to playback and display of video data provided by being imaged and then recorded at a rate several times faster than the standard frame rate.

As one usual imaging apparatus that allows a playback speed of the moving picture to be varied, it is to be noted that there is provided one technology that assumes use of a counter having an operating speed that is varied at a playback time of a video stream, permitting a count value by the counter to be synchronized with a time stamp appended to the video stream (See Japanese Patent Laid-open 2002-33712 (paragraphs [0020] to [0032] and FIG. 1), for instance).

SUMMARY OF THE INVENTION

However, in a case where an attempt is made to achieve the slow-motion playback of the video stream provided by being recorded through fast imaging as described the above, recording of the playback time control information in the data stream according to a technique as usual leads to a failure of the slow-motion playback meeting a user's intention at the playback time, because of a difference in time passage manner between a recording period and a playback period. If the playback time control information synchronized with a real time is recorded in the data stream at the time when imaging with the fast frame rate is provided, for instance, the playback with the standard frame rate based on the above time information according to the same technique as the usual one causes frames to be forwarded as fast as an imaged time frame rate so that no slow-motion playback is achieved, resulting in skipping of the recorded frames provided in a period of the standard display cycle.

The present invention has been undertaken in view of the above problems, and provides a stream generating apparatus and a stream generating method that may both generate a multiplexed stream of a type that, upon receipt of input of moving picture data with a frame rate different from a normal frame rate, enables the received moving picture data to be easily played back at a speed different from a stream generating-time speed.

The present invention also provides an imaging apparatus that is configured to, after imaging a picture at a frame rate different from a normal frame rate, enable the imaged picture to be easily played back at a speed different from a speed at the imaged time.

The present invention further provides a data processing apparatus that is configured to, upon receipt of input of moving picture data with a frame rate different from a normal-time frame rate, enable the received moving picture data to be easily played back at a speed different from an input-time speed.

To solve the above problems, an embodiment of the present invention provides a stream generating apparatus which generates a multiplexed stream including moving picture data. The stream generating apparatus includes a moving picture encoding processing section; a time control information generating section; and a multiplexing processing section. The moving picture encoding processing section generates a moving picture stream by encoding the moving picture data allowing switching between a reference frame rate and more than one frame rate different from the reference frame rate according to a desired timing. The time control information generating section generates playback time control information with certain intervals corresponding to picture frame display cycles relevant to the reference frame rate, for each picture frame inputted to the moving picture encoding processing section. The multiplexing processing section generates the multiplexed stream by multiplexing the moving picture stream and the playback time control information.

In the above stream generating apparatus, the moving picture encoding processing section accepts input of the moving picture data allowing the switching between the reference frame rate and more than one frame rate different from the reference frame rate according to the desired timing, and then generates the moving picture stream by encoding the accepted moving picture data. The time control information generating section generates the playback time control information with the certain intervals corresponding to the picture frame display cycles relevant to the reference frame rate, for each picture frame inputted to the moving picture encoding processing section. The multiplexing processing section generates the multiplexed stream by multiplexing the generated moving picture stream and the generated playback time control information. If the multiplexed stream generated in this manner is played back at a speed corresponding to the reference frame rate, the moving picture data as far as that entered the moving picture encoding processing section at the frame rate different from the reference frame rate is played back at the frame rate different from the input-time frame rate of the moving picture data.

According to the stream generating apparatus of the embodiment of the present invention, the playback time control information with the certain intervals corresponding to the picture frame display cycles relevant to the reference frame rate is generated for each picture frame inputted, irrespectively of the frame rate of the moving picture data inputted, and is then stored in the multiplexed stream. Thus, the playback of the multiplexed stream generated in this manner at the speed corresponding to the reference frame rate allows the moving picture data as far as that inputted in the moving picture encoding processing section at the frame rate different from the reference frame rate to be played back at the frame rate different from the input-time frame rate of the moving picture data. Accordingly, playback processing with a certain frame rate as usual enables generation of the multiplexed stream applicable to implement a special-purpose playback operation such as the slow-motion playback.

BRIEF DESCRIPTION OF THE DRAWINGS

The features and advantages of the present invention will become more apparent in the following description of presently preferred embodiments of the invention taken in conjunction with the accompanying drawings, in which.

DESCRIPTION OF THE EMBODIMENTS

Figure 1:
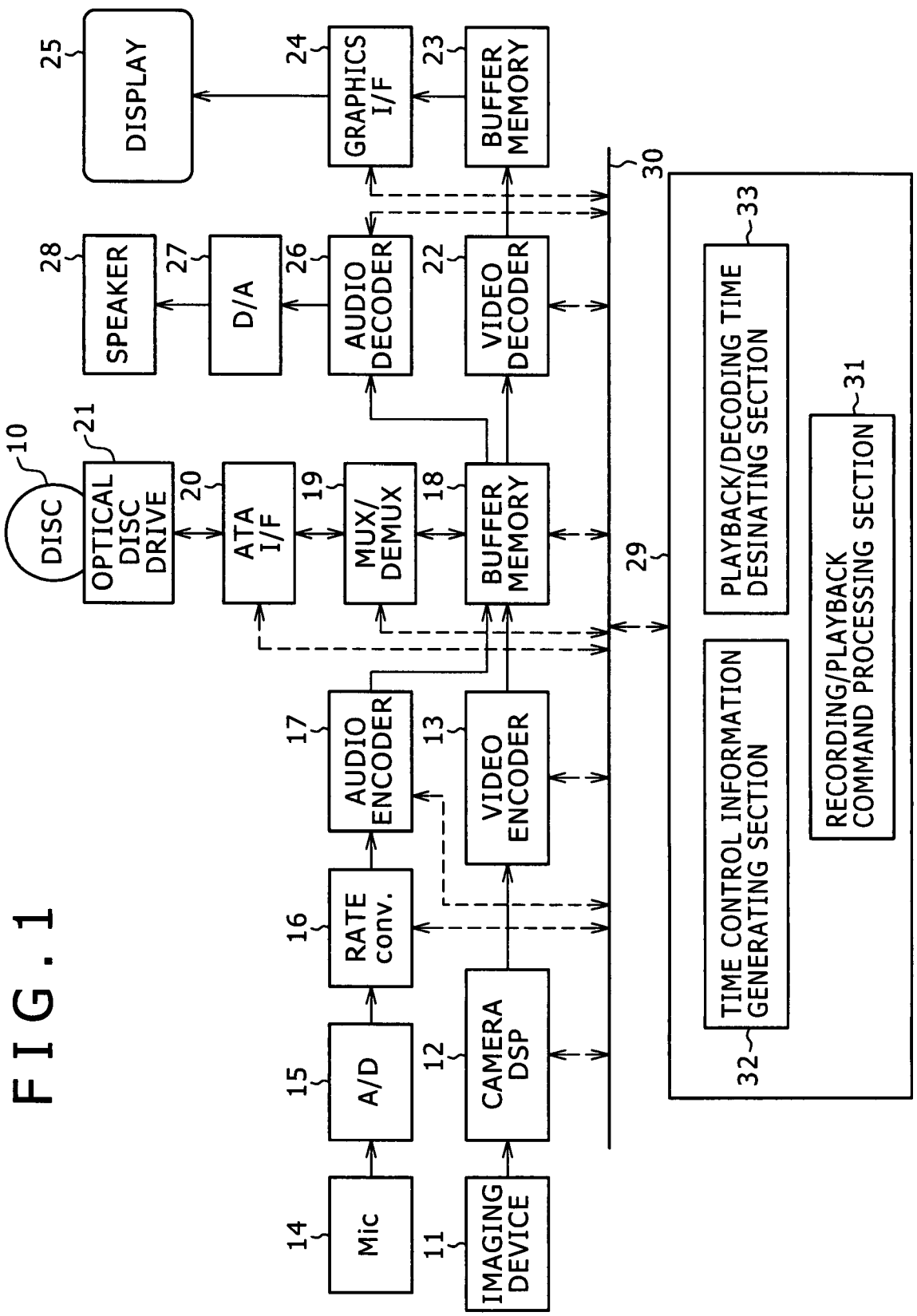
FIG. 1 is a block diagram showing a configuration of an imaging apparatus according to one embodiment of the present invention.

FIG. 1 is a block diagram showing a configuration of an imaging apparatus according to one embodiment of the present invention.

The imaging apparatus shown in FIG. 1 includes a so-called digital video camera that is to, after imaging a moving picture, record the imaged moving picture as digital data in a recording medium. And, the imaging apparatus shown employs an optical disc 10 such as DVD (Digital Versatile Disk) as one recording media for recording a data stream including a video signal.

The imaging apparatus shown has an imaging device 11, a camera DSP (Digital Signal Processor) 12, a video encoder 13, a microphone 14, an audio data A/D (Analog/Digital) converter 15, an audio data sampling rate converter 16, an audio encoder 17, a buffer memory 18, a MUX/DEMUX (Multiplexer/Demultiplexer) 19, an ATA (AT Attachment) interface 20, an optical disc drive 21, a video decoder 22, a video data buffer memory 23, a graphics interface 24, a display 25, an audio decoder 26, a D/A (Digital/Analog) converter 27, a speaker 28, a CPU (Central Processing Unit) 29, and an internal bus 30.

The imaging device 11 includes a solid-state imaging device such as CCD (Charge Coupled Devices) and CMOS (Complementary Metal-Oxide Semiconductor) image sensor, and converts convergent light provided by an optical block (not shown) into an electric signal.

The camera DSP 12 performs, under control of the CPU 29, various analog signal processing such as CDS (Correlated Double Sampling) and AGC (Auto Gain Control) on a picture signal supplied from the imaging device 11, as well as various digital processing such as A/D conversion, detection for imaging operation control and picture quality correction.

It is to be noted that the imaging device 11 is provided so as to allow output of imaged picture signals with, in addition to a standard frame rate, a fast frame rate higher than the standard one, as described later. And, the camera DSP 12 is provided so as to allow sequential processing of the signals of the pictures imaged at the above fast frame rate.

The video encoder 13 encodes video data outputted from the camera DSP 12 under control of the CPU 29 according to a predetermined compression and encoding scheme. As for one embodiment of the present invention, the video encoder 13 is operative to, after effecting compression and encoding processing according to the MPEG system, supply the encoded video data as a video ES (Elementary Stream) to the buffer memory 18.

The microphone 14 picks up an audio signal. The A/D converter 15 converts the picked-up audio signal provided by the microphone 14 into digital data. The sampling rate converter 16 performs conversion of a sampling rate of the digitized audio data depending on a control signal from the CPU 29.

It is to be noted that the present embodiment provides one configuration that, with regard to the digitized audio data provided at a certain sampling rate by the A/D converter 15, the above certain sampling rate is converted through operations in the sampling rate converter 16. However, instead of installing the sampling rate converter 16, it may be modified to provide a variable sampling rate as a digital conversion processing-time sampling rate at the A/D converter 15 so as to control the variable sampling rate from the CPU 29.

The audio encoder 17 encodes the audio data supplied from the sampling rate converter 16 according to the predetermined compressing and coding scheme such as the MPEG, and then supplies the encoded audio data as an audio ES to the buffer memory 18.

The buffer memory 18 buffers and outputs, to the MUX/DEMUX 19 under control of the CPU 29, various information to be stored in the data stream, such as the video ES and the audio ES supplied from the video encoder 13 and the audio encoder 17 and various time control information outputted from the CPU 29. At the buffer memory 18, the video ES and the audio ES supplied from the MUX/DEMUX 19 are also buffered and outputted respectively to the video decoder 22 and the audio decoder 26 under control of the CPU 29.

The MUX/DEMUX 19 reads out and packetizes the video ES and the audio ES etc. placed in the buffer memory 18, and then multiplexes packets of these streams to generate and output a PS (Program Stream) to the optical disc drive 21 through the ATA interface 20. At the MUX/DEMUX 19, the video ES, the audio ES and various header information are separated from the PS read from the optical disc 10, and each ES data is stored in the buffer memory 18, while the header information is outputted to the CPU 29.

The ATA interface 20 includes an interface circuit for making connection with the optical disc drive 21, and controls a recording/playback operation of the optical disc drive 21 depending on the control signal from the CPU 29. The optical disc drive 21 effects writing of data onto the detachable optical disc 10 and reading of the recorded data from the optical disc 10.

The video decoder 22 reads the video ES provided by being read out from the optical disc 10 and then stored in the buffer memory 18, and then decompresses and decodes the video data according to the MPEG system under control of the CPU 29. The buffer memory 23 buffers the video data outputted from the video decoder 22.

The graphics interface 24 converts the video data supplied from the buffer memory 23 or from the camera DSP 12 through the internal bus 30 into a signal required for displaying, and then supplies the signal to the display 25. The display 25 is composed of an LCD (Liquid Crystal Display), for instance, and displays a picture in process of being imaged or a played-back picture of the data contained in the optical disc 10.

The audio decoder 26 reads the audio ES provided by being read out from the optical disc 10 and then stored in the buffer memory 18, and then decompresses and decodes the audio data under control of the CPU 29. The D/A converter 27 converts the audio data supplied from the audio decoder 26 into an analog signal, and then outputs the analog signal to the speaker 28 to provide a played-back sound.

The CPU 29 totally controls the imaging apparatus by executing a program placed in a memory (not shown). The imaging apparatus according to one embodiment of the present invention has, as functions of the CPU 29, a recording/playback command processing section 31 for processing commands to record the video/audio data in the optical disc 10 and to play back the recorded video/audio data, a time control information generating section 32 which generates time control information for playback and decoding at the time of data recording, and a playback/decoding time designating section 33 which designates a playback/decoding time based on the time control information at the time of data playback.

Basic video/audio data recording and playback operations with the above imaging apparatus are now described. Firstly, when the CPU 29 is given a recording request depending on input to an input unit (not shown) by a user operation, the recording/playback command processing section 31 causes the video encoder 13 and the audio encoder 17 to start encoding processing in response to the request. The video data outputted from the camera DSP 12 is sequentially encoded by the video encoder 13 into the form of the video ES, which is then stored in the buffer memory 18. The audio data outputted from the A/D converter 15 is supplied to the audio encoder 17 through the sampling rate converter 16, and is then sequentially encoded into the form of the audio ES, which is then stored in the buffer memory 18. At this time, it is to be noted that the video data from the camera DSP 12 is also supplied to the graphics interface 24 through the internal bus 30, causing the picture in the process of being imaged to be displayed on the display 25.

As the video ES and the audio ES are generated, the time control information generating section 32 generates and successively stores, in the buffer memory 18, the PTS indicating the time control information for playback of the video data and DTS (Decoding Time Stamp) indicating the time control information for decoding of the video data.

The MUX/DEMUX 19 packetizes, under control of the recording/playback command processing section 31, the video ES and the audio ES read from the buffer memory 18 respectively, and further, forms more than one packet into a pack to multiplex the packets as the PS. At this time, the PTS and the DTS both placed in the buffer memory 18 and various information outputted from the CPU 29 are to be stored in a predetermined header area of the packet and/or the pack. The PTS is stored in the header of each packet containing the top data of the access unit, while the DTS is stored in the header of the packet containing an I or P picture, among the packets. The PS generated in this manner is recorded in the optical disc 10 according to a predetermined file format.

On the other hand, if the CPU 29 is given a playback request depending on the input by the user operation, the recording/playback command processing section 31 controls the ATA interface 20 to cause the optical disc drive 21 to read the data stream placed in the optical disc 10, causing the read data stream to be supplied to the MUX/DEMUX 19. The MUX/DEMUX 19 extracts the PS from the input data, and then separates the video ES and the audio ES from the extracted PS to supply the video ES and the audio ES to the buffer memory 18, while outputting, to the CPU 29, the information extracted from the header.

The playback/decoding time designating section 33 supplies the video ES and the audio ES both placed in the buffer memory 18 to the video decoder 22 and the audio decoder 26 respectively to designate the playback/decoding time for the video decoder 22 and the audio decoder 26. Particularly, for the video data, a decoding timing is to be designated based on the DTS separated by the MUX/DEMUX 19, and a playback timing is to be designated based on the PTS separated likewise. In this manner, the played-back picture provided from the data stream placed in the optical disc 10 is displayed on the display 25, and the played-back sound is outputted through the speaker 28.

By the way, the imaging apparatus of this type has a function that is to, in addition to the standard frame rate, record the imaged picture data in the optical disc 10 after imaging with the fast frame rate higher than the standard one. The picture data provided by being imaged at the fast frame rate is generated in the form of the video ES having the standard frame rate, and is then recorded in the optical disc 10. This processing allows the picture provided by being imaged at the fast frame rate to be displayed at a speed slower than a speed of the imaged time by playing back the recorded picture data at the standard frame rate as usual. However, in order to implement the function of this type, it is necessary to change a way of calculating the playback and/or decoding time control information at the time when the switching from the imaging with the standard frame rate to that with the fast frame rate is provided.

Figure 2:
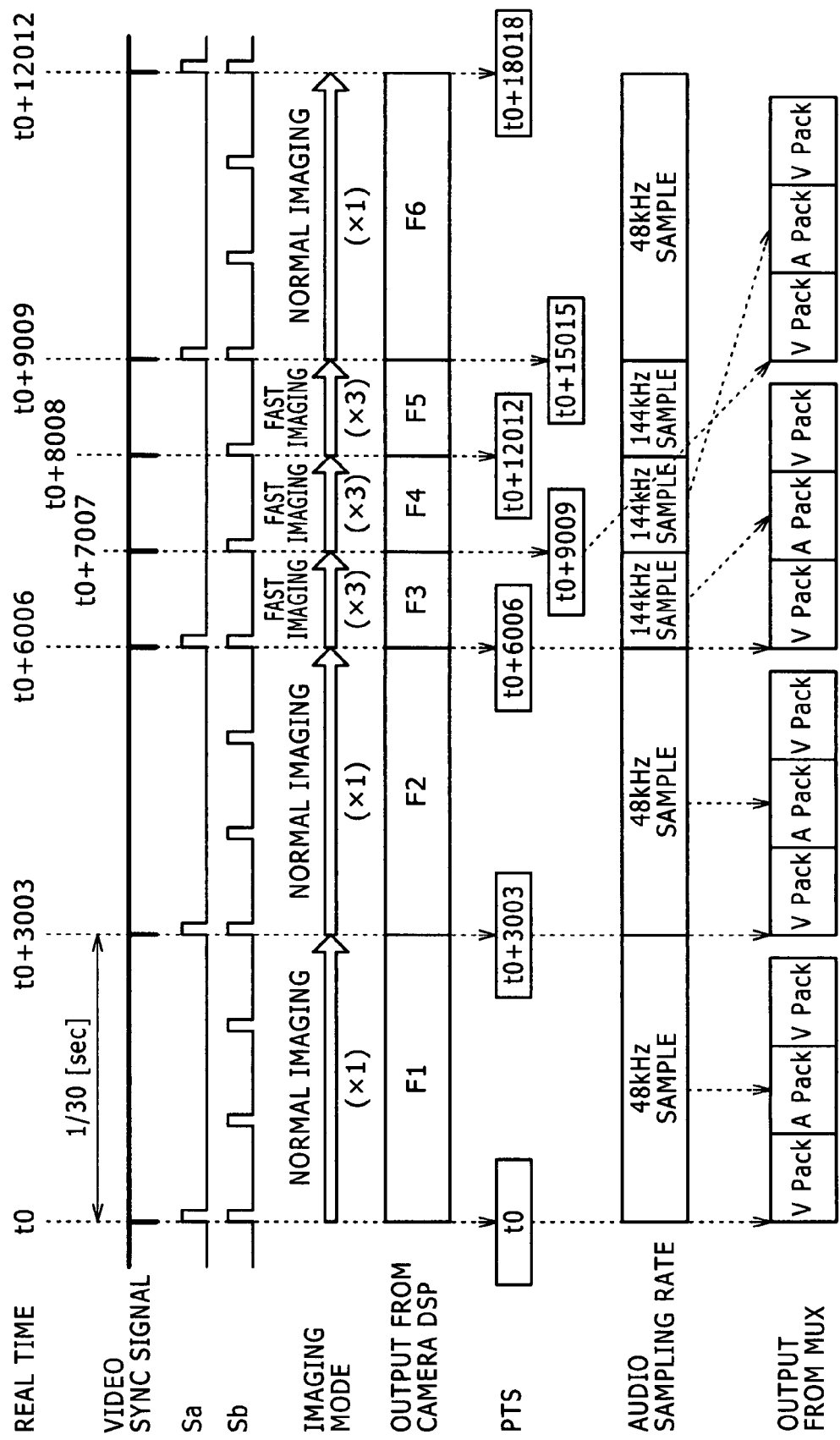
FIG. 2 is a time chart for explaining an operation of the imaging apparatus at the time of recording of video data and audio data.

FIG. 2 is a time chart for explaining an operation of the imaging apparatus at the time of recording of the video data and the audio data.

The present embodiment is supposed to provide two types of imaging modes, a normal imaging mode for imaging with a frame rate of 30 frames per second (or 60 fields per second) and a fast imaging mode for imaging with a three times faster frame rate of 90 frames per second (or 180 fields per second), and also to allow the switching between these two imaging modes as desired during the imaging and the recording. Then, the imaging device 11 is provided so as to allow the output of the imaged picture signals with these two types of frame rates. The camera DSP 12 is provided so as to allow the processing of the picture signals in synchronization with these two types of frame rates.

In FIG. 2, a real time (or an actual operating time) is expressed in terms of a count value of a 90-kHz clock frequency specified as a decoding-time reference clock (STC: System Time Clock) frequency. In one recording operation in FIG. 2, it is assumed that the recording of the imaged picture is started at a time "t0", and the normal imaging mode is taken for the recording in a period of the time from "t0" to "t+6006". It is also assumed that the switching to the fast imaging mode is made at the time "t0+6006" to provide the imaging with the three times faster frame rate, followed by re-switching to the normal imaging mode at a time "t0+9009", leading to a continuity of the recording. In FIG. 2, it is to be noted that frames (or video frames) generated with a recording start time as a starting point are expressed as F1, F2, F3 . . . in this order.

It is also to be noted that timing signals Sa and Sb in FIG. 2 represent frame generating timings related to the normal imaging mode and the fast imaging mode, respectively. These timing signals Sa and Sb are generated by the CPU 29, and may be shared with a signal for generating a vertical sync signal (V_sync) that provides a sync timing for the imaging device 11 etc. in each imaging mode, for instance.

If the recording of the picture is started at the time "t0", the time "t0" at the recording start time is assumed to be the PTS corresponding to the first frame F1. For the frame F2 generated at the next time "t0+3003", the PTS assumes a value provided by adding "3003" specified as a 90-kHz count value corresponding to 1/30 seconds to the time "t0" provided as the recording start time. That is, the same information as the real time may be set as the PTS until the time "t0+6006" is reached.

Subsequently, if the mode is switched to the fast imaging mode at the time "t0+6006", the PTS corresponding to the frame F3 at that time becomes "t0+6006". However, in a period in which the fast imaging mode is set, there is a difference between an imaged-time frame generating interval (or an output interval of the frame from the camera DSP 12) and a playback-time frame output interval. That is, these frames are supposed to be played back at a speed as slow as one third of the speed at the imaged time.

Thus, on and after the time "t0+6006", a time different from the real time should be set as the PTS. For instance, if generation of the data stream takes place by providing each PTS corresponding to the frames F4, F5 and F6 as "t0+7007", "t0+8008", and "t0+9009", which are the same time as the real time, the frames F4 and F5 are skipped without being played back at the time of the decoding of the generated data stream with the frame rate of 30 frames per second, in which case, the output of the frame F3 is followed by the output of the frame F6 after 1/30 seconds specified as a normal-time output period, leading to a failure of the slow-motion playback.

Accordingly, for the time "t0+7007" later than the switching to the fast imaging mode, "t0+9009" provided by being incremented by a count value (3003) corresponding to the normal display cycle is to be set as the PTS. Likewise, at the time "t0+8008", the PTS is set as "t0+12012", and at the time "t0+9009", the PTS is set as "t0+15012". As described in the above, in any case where the fast imaging mode is set, the PTS corresponding to each frame is to be incremented sequentially in units of the same certain value as that in the normal imaging mode, or in units of a certain value corresponding to a frame output period related to the normal imaging mode.

After the switching to the normal imaging mode at the time "t0+9009", the PTS is sequentially incremented by an amount of time (or the count value) corresponding to an imaging interval. For instance, the PTS of a frame (not shown) generated at a time "t0+12012" is provided as "t0+18018".

The PTS generated as described above is recorded in the header of the packet including the top video data of the access unit (or the frame) at the time when being multiplexed by the MUX/DEMUX 19. The same is also applied to the audio data, and therefore, the same PTS is recorded in the header of the packet including the top audio data of the access unit corresponding to the above frame.

By the way, the MPEG system provides a predictive coding for forward and backward picture data, so that a picture playback order sometimes disagrees with a picture decoding order, leading to a need for the video data to record the DTS together with the PTS in the header of the packet. The pictures having no agreement between the playback timing and the decoding timing are the I and P pictures, so that the recording of the DTS corresponding to these pictures is only needed. The normal video ES includes a certain number of consecutive B pictures disposed between the I and P pictures or between the P pictures, permitting the DTS to be obtained by adding or subtracting a certain time suited for the number of consecutive B pictures to or from the PTS. Specifically, assuming that the number of consecutive B pictures is n, the DTS may be obtained by subtracting the time corresponding to a period (n+1) times the frame period related to the normal imaging mode from the PTS.

Referring to FIG. 2, if considering n as 2, for instance, the frames F1, F2, F4 and F5 are encoded as the B pictures, the frame F3 is encoded as the I picture, and the frame F6 is encoded as the P picture. To encode the frames F1 and F2 among the above frames as the B pictures, data of the frame F3 is used. Thus, the decoding of the frames F1 and F2 provided as the B pictures requires decoded data of the frame F3. Accordingly, the frame F3 needs to be decoded before the decoding of the frames F1 and F2, and hence, the DTS corresponding to the frame F3 assumes a value provided by subtracting "9009" equivalent to the period three times the frame period, from "t0+6006" specified as a PTS value. Likewise, the decoding of the frames F4 and F5 provided as the B pictures requires the frames F3 and F6, so that the frame F6 needs to be decoded before the decoding of the frames F4 and F5, and hence, the DTS corresponding to the frame F6 assumes a value provided by subtracting "9009" from "t0+9009" specified as the PTS value. In this manner, the DTS for the I and P pictures is obtained as the value provided by subtracting a fixed value, or "9009" from the PTS value.

Referring to an "OUTPUT FROM MUX" column in FIG. 2, there are shown the video and audio packs corresponding to the respective frames in frame input order. However, it is to be noted that this illustration is only for simplification, and the same order as the above is not applied practically to the case of the predictive coding. For the video ES outputted from the video encoder 13, for instance, the data of each frame (or each picture) is subjected to sorting in decoding order. Of course, the output timing of the pack corresponding to each frame in the MUX/DEMUX 19 is not necessarily the same as that shown in FIG. 2.

Figure 3:
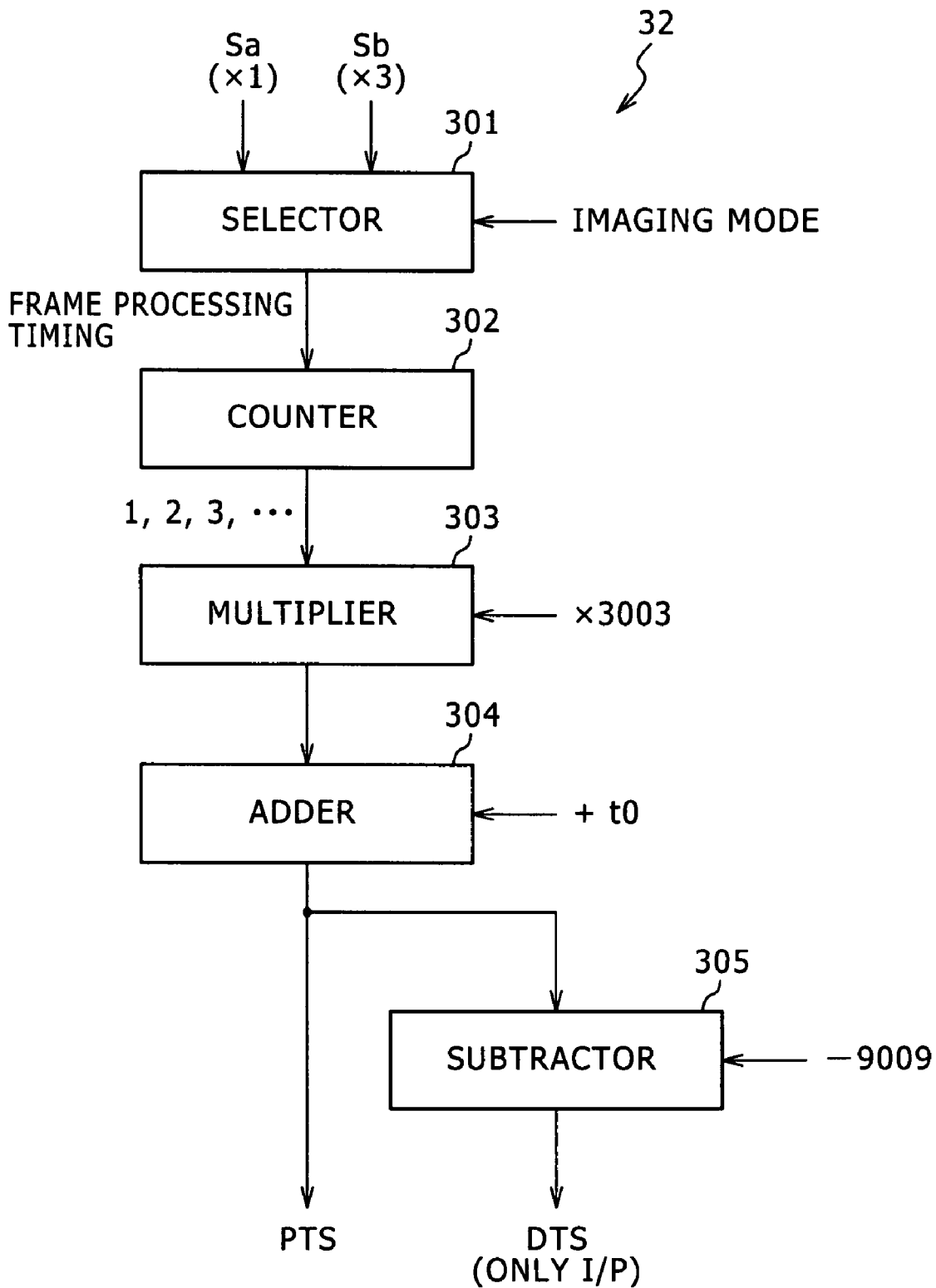
FIG. 3 is a block diagram showing a first functional configuration example of a time control information generating section.

FIG. 3 is a block diagram showing a first functional configuration example of the time control information generating section.

The time control information generating section 32 shown in FIG. 3 has a selector 301, a counter 302, a multiplier 303, an adder 304, and a subtractor 305.

The selector 301 accepts the input of the timing signal Sa or Sb that provides the frame processing timing related to the normal imaging mode and the fast imaging mode, respectively. As described above, the signal outputted from the CPU 29 to provide the vertical sync signal for the imaging device 11 etc., for instance, may be used as the timing signals Sa and Sb. The period of the timing signal Sb is supposed to be one third of the period of the timing signal Sa.

The selector 301 captures the imaging mode managed in the recording/playback command processing section 31 depending on the user operation, and selects the input of the timing signal Sa if the current imaging is in the normal imaging mode, while selecting the timing signal Sb in the case of the fast imaging mode. A selecting operation like the above allows the output signal from the selector 301 to generate the processing timing of the time control information generating section 32 for each frame suited for the imaging mode. The output signal from the selector 301 may be basically the same as the timing signal that designates the timing of the video decoder 13 to start the encoding of the corresponding pictures or to output the encoded pictures to the buffer memory 18.

The counter 302 counts the timing signal outputted from the selector 301 with the recording start time as the starting point. Specifically, in the normal imaging mode, the timing signal Sa is counted, while in the fast imaging mode, the timing signal Sb is counted. This counting processing causes a sequentially processed frame number provided in each imaging mode to be outputted from the counter 302.

The multiplier 303 multiplies the count value in the counter 302 by a fixed value "3003" representing the frame output period related to the normal imaging mode. The adder 304 adds the time t0 read at the recording start time to the output value from the multiplier 303. It is to be noted that the recording start time t0 is read through built-in clock (not shown) that provides 90-kHz count values.

With the above configuration, the output value from the adder 304 is assumed to be the PTS, which is then stored in the buffer memory 18 in correspondence with the picture data. The subtractor 305 subtracts the fixed value "9009" corresponding to the period three times the frame output period related to the normal imaging mode from the output value from the adder 304. The output value from the subtractor 305 is to be the DTS, in which case, however, storage of the DTS in the buffer memory 18 in correspondence with the picture data takes place only when the picture corresponding to the DTS value is the I or P picture. Alternatively, it is also allowable to bring the subtractor 305 into operation only when the corresponding picture is the I or P picture.

While the above configuration includes the adder 304 for incrementing the time t0 read at the recording start time, it is to be noted that the output value from the multiplier 303 may be employed as the PTS without providing the adder 304.

Figure 4:
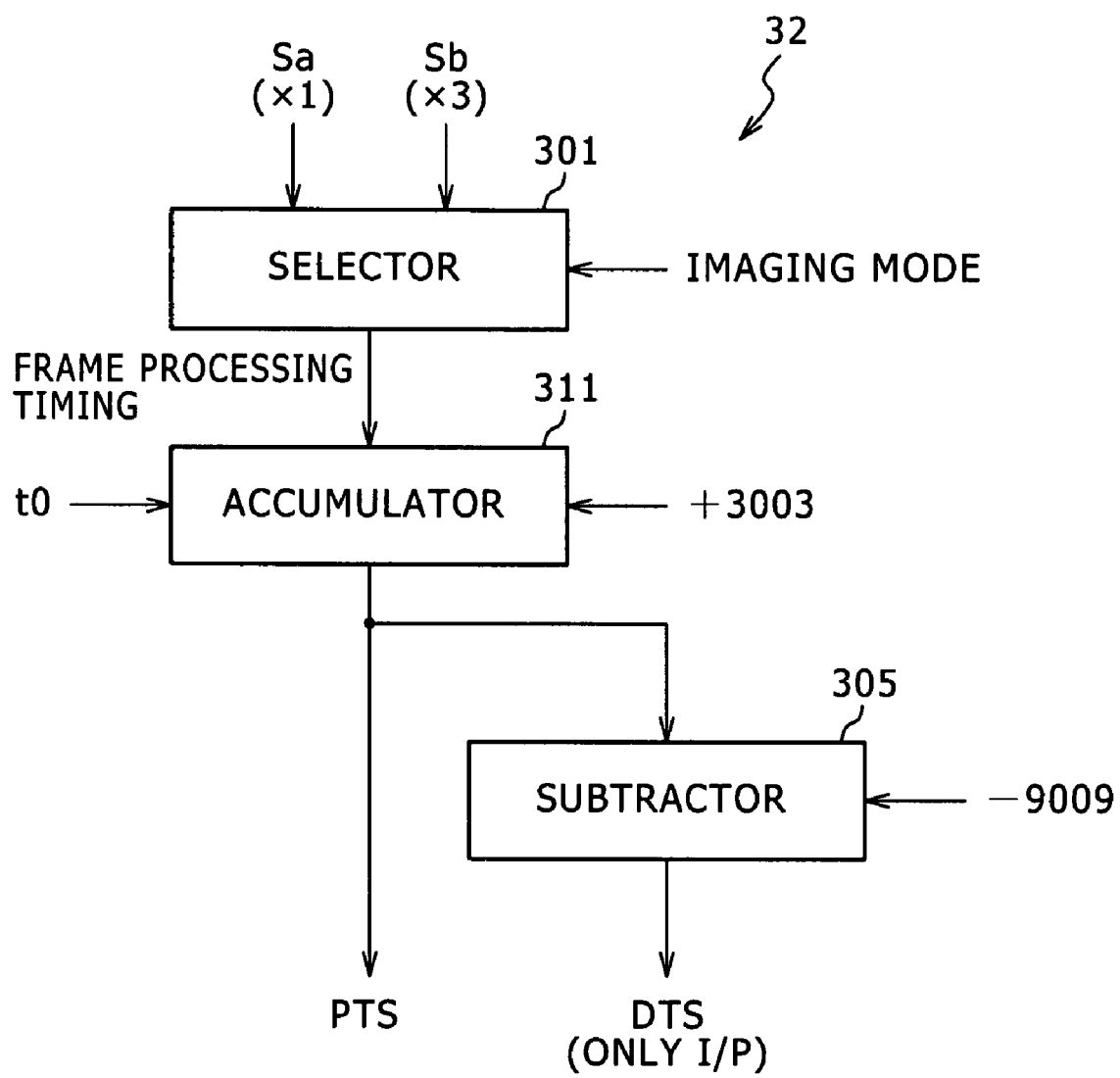
FIG. 4 is a block diagram showing a second functional configuration example of the time control information generating section.

FIG. 4 is a block diagram showing a second functional configuration example of the time control information generating section.

The second functional configuration in FIG. 4 provides one configuration applied to a case where an accumulator 311 is used as a substitute for the functions of the counter 302, the multiplier 303 and the adder 304 among the components shown in FIG. 3. The accumulator 311 cumulatively adds the fixed value "3003" representing the frame output period related to the normal imaging mode to the time t0 read at the recording start time according to the input timing of the timing signal from the selector 301 depending on the imaging mode. The output value from the accumulator 311 is to be the PTS. Like the configuration in FIG. 3, the subtractor 305 subtracts the fixed value "9009" from the output value from the accumulator 311, and the output value from the subtractor is to be the DTS. In the case of the configuration in FIG. 4, it is allowed that the accumulator 311 also effects cumulative addition with "0" as the starting point without reading the time t0 at the recording start time.

Figure 5:
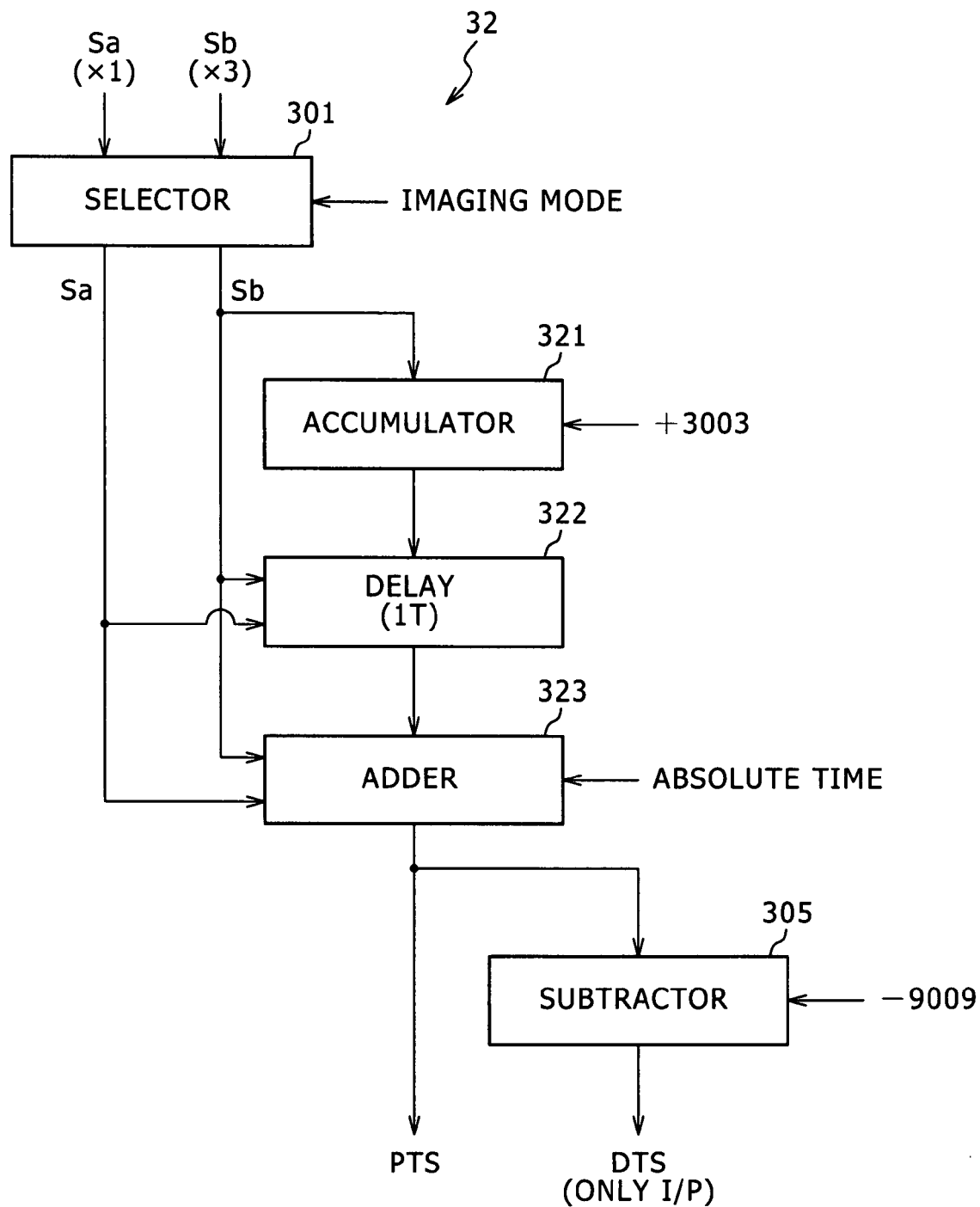
FIG. 5 is a block diagram showing a third functional configuration example of the time control information generating section.

FIG. 5 is a block diagram showing a third functional configuration example of the time control information generating section.

The configurations in FIGS. 3 and 4 are to generate the time control information based on the time t0 read at the recording start time, whereas the configuration in FIG. 5 permits the time control information to be generated based on an absolute time related to each frame processing timing. The absolute time may be a real time count value generated by the built-in clock, or a control count value counted inside the camera DSP 12 for each input or output of the frame with the recording start time as the starting point, for instance.

Referring to FIG. 5, the selector 301 selects and outputs the timing signal Sa if the current imaging is in the normal imaging mode, while selecting and outputting the timing signal Sb in the case of the fast imaging mode, like the configurations shown in FIGS. 3 and 4. However, the selector 301 in FIG. 5 is operative to output the selected timing signals Sa and Sb individually.

An accumulator 321 cumulatively adds the fixed value "3003" to an initial value "0" every time the input of the timing signal Sb from the selector 301 occurs. The timing signal Sb from the selector 301 is inputted only when the fast imaging mode is set, and hence, the accumulator 321 effects the cumulative addition only in the period of the fast imaging mode.

Upon receipt of the input of the timing signal Sa or Sb selected by the selector 301, a delay 322 provides its output value by causing the output value from the accumulator 321 to be delayed until the next input of any timing signal occurs.

An adder 323 reads the absolute time every time the input of the timing signal Sa or Sb from the selector 301 occurs, and then adds the output value from the delay 322 to the read absolute time. The output value from the adder 323 is to be the PTS. It is to be noted that as in the case shown in FIGS. 3 and 4, the function of the subtractor 305 is to subtract the fixed value "9009" from the output value from the adder 323, and the output value from the subtractor 305 is to be the DTS.

In this configuration, the accumulator 321 effects the cumulative addition of "3003" upon receipt of the input of the timing signal Sb only at the time when the fast imaging mode is set. The normal imaging mode causes no input of the timing signal Sb, so that a value obtained by the last cumulative addition is to be outputted intact. Thus, an amount of offset to the absolute time at the adder 323 is assumed to be a fixed value in the case of the normal imaging mode, while being incremented in units of "3003" every attempt to generate the frame in the case of the fast imaging mode. However, for the timing (the time "t0+6006", and "t0+9009" in FIG. 2, for instance) of switching from one imaging mode to the other, the amount of offset provided in the imaging mode immediately before the switching must be reflected in the PTS, so that the input to the adder 323 is made to be provided after the delay of the offset by an amount corresponding to one period of the input clock is generated with the delay 322.

It is to be noted that the actual stream generating processing according to the MPEG system needs to generate and append SCR (System Clock Reference) as the time control information to the pack header, in addition to the PTS and the DTS. The SCR is to designate a time to store the stream in a decoder-side virtual buffer (or a so-called VBV buffer). Thus, resetting of the standard clock (or the STC) with the SCR on the decoder side enables the timing control for the decoding and the playback with the DTS and the PTS.

As in the case of the PTS, the SCR is also obtained at all times by incrementing the certain period of time corresponding to the normal imaging mode, no matter which imaging mode is set. However, unlike the PTS, the SCR is determined on the basis of both of a bit rate applied to read out the video data from the VBV buffer to the decoder and an amount of data stored in the VBV buffer, and is supposed to take a 27-MHz count value in the case of MPEG-2 system.

According to DVD-Video standards, a single pack is 2 K bytes (or 2048 bytes) long, so that for the storage of 2048-byte video data in the VBV buffer at 10.08 Mbps, for instance, the SCR value is assumed to be 2048×8 (bits)/10.08=43866, and is then, incremented by a fixed value "43866" for each pack. In the imaging apparatus, when generating the single video pack from the buffer memory 18 by the MUX/DEMUX 19, the SCR provided by being incremented by the fixed value like the above on all such occasions is generated by the time control information generating section 32, and is then stored in the pack header.

Capturing of the audio data is now described with reference to FIG. 2 again. The audio data is supposed to be captured with the sampling rate as 48 kHz in the normal imaging mode. According to one embodiment of the present invention, the audio data A/D converter 15 effects the digital conversion at the certain sampling rate of 48 kHz, and the sampling rate converter 16 outputs the input data without conversion in the case of the normal imaging mode.

In the fast imaging mode, the capturing of the audio data is effected each time according to the imaging timing, in which case, a three times faster sampling rate as much as 144 kHz is adopted. Specifically, when the mode is switched to the fast imaging mode, the function of the sampling rate converter 16 is turned on by the control from the CPU 29. Then, the audio data with the sampling rate of 48 kHz, after digitally converted by the A/D converter 15 in accordance with the imaging timing, is converted by the sampling rate converter 16 into the audio data with the sampling rate of 144 kHz. It is to be noted that instead of installing the sampling rate converter 16, it is also allowable to change the digital conversion-time sampling rate of the A/D converter 15 to 144 kHz.

The operation like the above enables not only the picture but also the sound to be played back at the speed as slow as one third in a case where the playback of the recorded audio data provided in the fast imaging mode occurs at the one third speed together with the video data.

Figure 6:
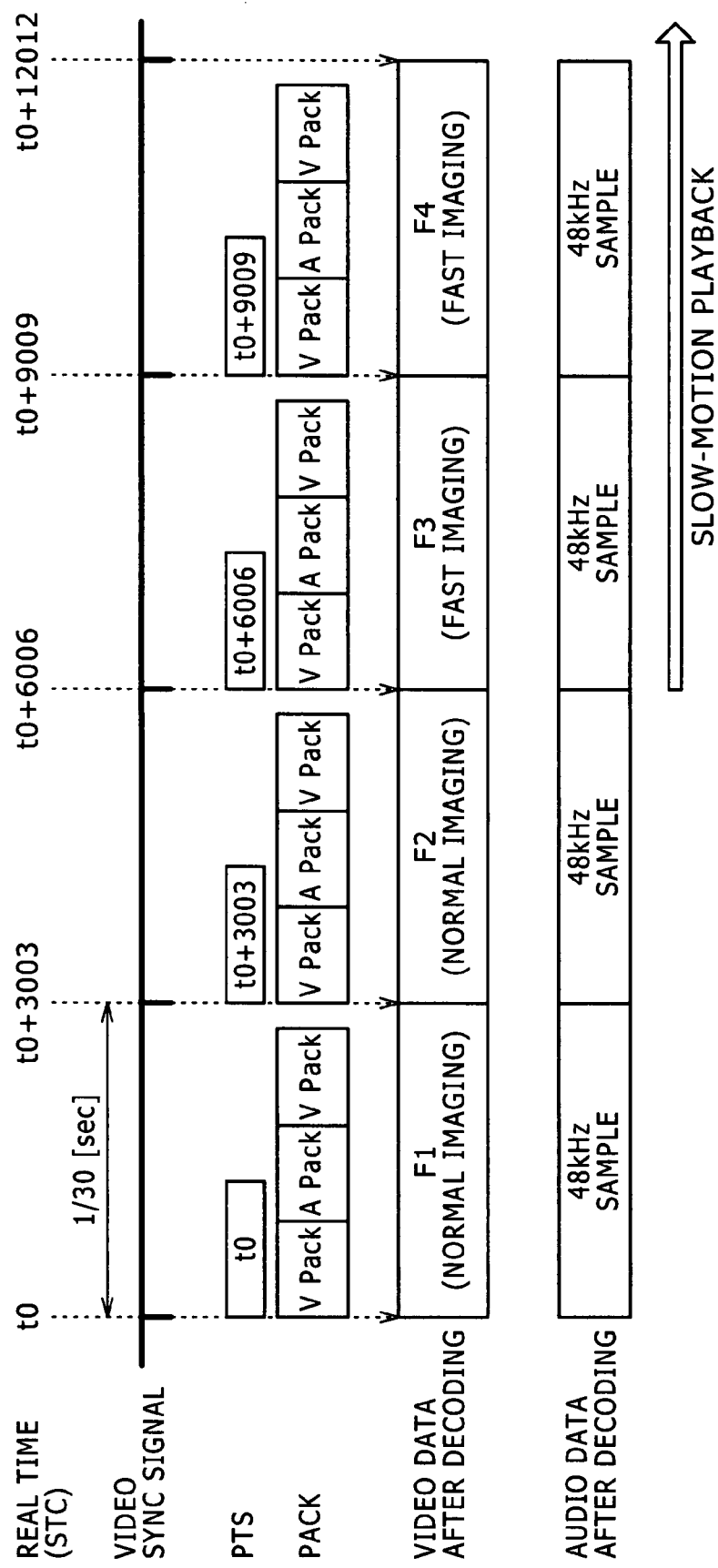
FIG. 6 is a time chart for explaining an operation of the imaging apparatus at the time of playback of the video data and the audio data.

FIG. 6 is a time chart for explaining an operation of the imaging apparatus at the time of the playback of the recorded video and audio data provided as described above.

The operation shown in FIG. 6 provides one operation applied to the case of the playback of the data stream provided by being imaged and then recorded in the optical disc 10 through the operation in FIG. 2. Referring to a "PACK" column in FIG. 6, while there is shown one arrangement of the video and audio packs in the playback order to simplify the correspondence between the video and the audio data to be played back, these packs are practically to be inputted to the MUX/DEMUX 19 in an order of video data decoding. The real time in FIG. 6 represents the 90-kHz count value (or the STC) set in accordance with the DTS and the PTS.

In the imaging apparatus, in a case of playing back the data stream, various types of time control information separated from the header of the data stream in the MUX/DEMUX 19 are supplied to the CPU 29. The playback/decoding time designating section 33 of the CPU 29 resets the STC value on the basis of the separated SCR. The STC is counted at 90 kHz at all times, no matter which imaging mode was applied to record the data stream to be played back. Then, the playback/decoding time designating section 33 designates the decoding timing for the video decoder 22 when the DTS separated by the MUX/DEMUX 19 matches the STC value, while designating the playback timing when the PTS matches the STC value. For the audio decoder 26, the decoding and playback timings are designated on the basis of a judgment of matching between the PTS and the STC.

Referring to FIG. 6, the times "t0" and "t0+3003" permit the frames (or the video frames) F1 and F2 provided by being imaged and then recorded in the normal imaging mode to be played back at the same frame rate as that in the normal imaging mode as usual. At the same time, the audio data provided by being picked up and then recorded at the sampling rate of 48 kHz is also played back in synchronization with the frames F1 and F2. That is, these timings permit the picture and the sound to be played back at the same speed as the imaged time speed.

On the other hand, the times "t0+6006" and "t0+9009" permit the frames F3 and F4 provided by being imaged and then recorded in the fast imaging mode causing the three times faster frame rate to be played back. However, the PTS corresponding to the frames F3 and F4 has been recorded so as to match the display cycle of the normal imaging mode, so that the frames F3 and E4 are also played back at the same frame rate as that of the normal imaging mode. Thus, the output period of each of the frames F3 and F4 becomes third times longer than the output period at the imaged time, permitting the slow-motion playback of the frames F3 and F4 to be provided at the speed as slow as one third of the recording-time speed.

The audio data having been recorded in the fast imaging mode is equivalent to that provided by being picked up and then recorded at the sampling rate (144 kHz) three times the sampling rate in the normal imaging mode, and thus may be played back as usual in the audio decoder 26 as the audio data with the same sampling rate (48 kHz) as that of the recorded data provided in the normal recording mode in such a manner as to effect the playback at the speed as slow as one third of the recording-time speed in synchronization with the corresponding frames. Thus, the speed of the sound to be played back becomes one third of the recording-time speed, permitting the picture and the sound to be played back in synchronization with each other.

As described above, the data stream recorded using the time control information generating section 32 according to one embodiment of the present invention may be played back unquestionably using the usual decoder that provides the decoding and playback processing with the standard frame rate. In addition, the video data and the audio data provided by being recorded in the fast imaging mode may be given the slow-motion playback just that an imaging performer or the user is desired, without any particular setting at the playback time. Thus, it may be realized to provide a simply operated and enhanced value-added fast imaging/slow-motion playback function, while enhancing user's convenience in the slow-motion playback.

While the above embodiment employs, as the imaging period in the fast imaging mode, one type of the imaging period three times that in the normal imaging mode, it may be modified in the fast imaging mode to vary the imaging speed in multiple stages, for instance. For this case, more than one timing signal Sb for the fast imaging mode shown in FIGS. 3 to 5 may be inputted depending on the imaging speed. Alternatively, it is also allowable to provide an arbitrary controllable imaging speed, for which case, the change of the period of one type of the timing signal Sa depending on the imaging speed is only needed.

The present invention is also applicable to an imaging apparatus having a slow imaging mode with the frame rate slower than the normal imaging mode, instead of the fast imaging mode. In this case, the sequential increment of the PTS is provided at all times in units of the time corresponding to the frame processing period of the normal imaging mode, regardless of the imaging mode, leading to the playback ensuring that the picture provided by being imaged in the slow imaging mode may be played back faster than the imaged time speed. In a case where the slow imaging mode is set (or a case where the timing signal Sb is adapted for the slow imaging mode), it will be appreciated that the configuration of the time control information generating section 32 shown in FIG. 5 permits the PTS to be obtained by subtracting the output value from the delay 322 from the absolute time.

While the above embodiment of the present invention has been described in relation to one application of the present invention to the imaging apparatus that records, in the recording medium, the picture and the sound provided by being imaged and picked up, it is also allowable to apply the present invention to an apparatus that generates the data stream by encoding the signals of the picture and sound and then transmits the data stream to an external apparatus through a network. The picture and sound to be encoded are not limited to those provided by being imaged and picked up, and may be also broadcasting content signals received through a television tuner, or signals inputted through a digital or analog picture/sound input terminal, for instance. That is, the present invention may be applied to an apparatus that generate the data stream by encoding these picture and audio signals, in receipt of the input of the picture signal (and the audio signal synchronized with this picture signal) allowing the switching of more than one frame rate from each other.

Further, the present invention may be also applied to an apparatus that, in receipt of the input of the picture signal (and the audio signal synchronized with this picture signal) allowing the switching of more than one frame rate from each other, displays the picture and outputs the sound based on the picture and audio signals. For instance, there can be realized a special-purpose playback function of a type that provides automatic playback slower than the usual speed at the time of the input of the picture signal with the frame rate different from the reference frame rate by performing the processing as follows. The switching of the input picture data from the reference frame rate to the fast frame rate is followed by generation of the playback time control information provided by being incremented by the time corresponding to the frame period of the reference frame rate for each input of the picture frame to append the generated playback time control information to the picture signal (or to replace the appended original playback time control information). Then, a display processing section having accepted the input of the picture signal is caused to display the picture at the reference frame rate at all times based on the playback time control information.

It should be understood by those skilled in the art that various modifications, combinations, sub-combinations and alterations may occur depending on design requirements and other factors insofar as they are within the scope of the appended claims or the equivalents thereof.

What is claimed is:

1. A stream generating apparatus which generates a multiplexed stream including moving picture data, comprising:
a moving picture encoding processing section for generating a moving picture stream by encoding the moving picture data allowing switching between a reference frame rate and more than one frame rate different from the reference frame rate according to a desired timing;
a time control information generating section for generating playback time control information with certain intervals corresponding to picture frame display cycles relevant to the reference frame rate, for each picture frame inputted to the moving picture encoding processing section; and
a multiplexing processing section for generating the multiplexed stream by multiplexing the moving picture stream and the playback time control information,
in which the reference frame rate corresponds to a normal imaging mode and one of the more than one frame rate different from the reference frame rate corresponds to a fast imaging mode for imaging with a faster rate than that of the normal imaging mode, and
in which during a recording operation when the normal imaging mode is utilized from a start time the playback time control information corresponds to real time information from the start time until the normal imaging mode is switched to the fast imaging mode whereupon the playback time control information corresponds to a time different from the real time and when the fast imaging mode is switched back to the normal imaging mode the playback time control information is incremented so as to correspond to real time information added to the respective time different from the real time at the switch back from the fast imaging mode to the normal imaging mode, such that during a respective recording operation which involves the fast imaging mode a final value of the playback time control information corresponds to a total time which is different from a total recording time.

2. The stream generating apparatus according to claim 1, wherein:
the time control information generating section generates the playback time control information based on a value provided by multiplying the number of picture frames inputted to the moving picture encoding processing section by a time corresponding to the picture frame display cycle relevant to the reference frame rate.

3. The stream generating apparatus according to claim 1, wherein:
the moving picture encoding processing section has a function to compress and encode a certain number of consecutive picture frames by means of back-to-forth bi-directional predictive coding,
the time control information generating section generates, for the picture frame compressed and encoded without using the bi-directional predictive coding, decoding time control information for decompressing and decoding the picture frame by subtracting a predetermined value from the corresponding playback time control information with respect to the picture frame, and
the multiplexing processing section multiplexes the decoding time control information, together with the playback time control information to generate the multiplexed stream.

4. The stream generating apparatus according to claim 1, further comprising a stream recording section for recording the multiplexed stream in a recording medium.

5. The stream generating apparatus according to claim 1, further comprising a moving picture playback processing section for playing back the moving picture data contained in the multiplexed stream by, in receipt of input of the multiplexed stream, controlling a picture frame playback time based on the playback time control information contained in the multiplexed stream.

6. The stream generating apparatus according to claim 1, further comprising:
a digital audio input section for accepting input of audio data digitized at a certain sampling rate;

an audio encoding processing section for generating an audio stream by encoding the audio data from the digital audio input section, and then outputting the generated audio stream to the multiplexing processing section; and a sampling rate converting section for converting the sampling rate of the audio data inputted to the digital audio input section at the same time as the input of the moving picture data with the predetermined frame rate different from the reference frame rate to the moving picture encoding processing section into a value provided by multiplying a ratio of the predetermined frame rate to the reference frame rate by the certain sampling rate, and then outputting the converted sampling rate to the audio encoding processing section, wherein the multiplexing processing section multiplexes the audio stream together with the moving picture stream and the playback time control information.

7. The stream generating apparatus according to claim 1, further comprising:

a digital converting section for, upon receipt of the input of an analog audio signal, digitally converting and outputting the input audio signal to the multiplexing processing section, and setting the sampling rate of the analog audio signal at a value provided by multiplying a ratio of the predetermined frame rate to the reference frame rate by the sampling rate of the analog audio signal provided at the time of the input of the moving picture data with the reference frame rate, at the time of the input of the moving picture data with a predetermined frame rate different from the reference frame rate to the moving picture encoding processing section; and an audio encoding processing section for generating an audio stream by encoding audio data from the digital converting section, and then outputting the generated audio stream to the multiplexing processing section, wherein the multiplexing processing section multiplexes the audio stream together with the moving picture stream and the playback time control information.

8. An imaging apparatus for providing imaging of a picture, comprising:

a solid-state imaging device allowing an imaging signal to be outputted through switching between a reference frame rate and more than one frame rate different from the reference frame rate in accordance with a desired timing;

a moving picture encoding processing section for generating a moving picture stream by encoding the moving picture data provided by the imaging by the solid-state imaging device;

a time control information generating section for generating playback time control information with certain intervals corresponding to picture frame display cycles relevant to the reference frame rate, for each picture frame inputted to the moving picture encoding processing section; and a multiplexing processing section for generating a multiplexed stream by multiplexing the moving picture stream and the playback time control information, in which the reference frame rate corresponds to a normal imaging mode and one of the more than one frame rate different from the reference frame rate corresponds to a fast imaging mode for imaging with a faster rate than that of the normal imaging mode, and in which during a recording operation when the normal imaging mode is utilized from a start time the playback time control information corresponds to real time information from the start time until the normal imaging mode is switched to the fast imaging mode whereupon the playback time control information corresponds to a time different from the real time and when the fast imaging mode is switched back to the normal imaging mode the playback time control information is incremented so as to correspond to real time information added to the respective time different from the real at the switch back from the fast imaging mode to the normal imaging mode, such that during a respective recording operation which involves the fast imaging mode a final value of the playback time control information corresponds to a total time which is different from a total recording time.

9. The imaging apparatus according to claim 8, further comprising:

a sound pickup section for picking up sound and output the sound as an analog audio signal;

a digital converting section for effecting digital conversion of the analog audio signal from the sound pickup section at a certain sampling rate;

an audio encoding processing section for generating an audio stream by encoding audio data from the digital converting section, and then outputting the generated audio data to the multiplexing processing section; and a sampling rate converting section for, at the time of the imaging by the solid-state imaging device with a predetermined frame rate different from the reference frame rate, converting the sampling rate of the audio data from the digital converting section into a value provided by multiplying a ratio of the predetermined frame rate to the reference frame rate by the certain sampling rate, and then outputting the converted sampling rate to the multiplexing processing section, wherein the multiplexing processing section multiplexes the audio stream together with the moving picture stream and the playback time control information.

10. The imaging apparatus according to claim 8, further comprising:

a sound pickup section for picking up sound and outputting the sound as an analog audio signal;

a digital converting section for digitally converting and outputting the analog audio signal from the sound pickup section to the multiplexing processing section, and setting the sampling rate of the inputted analog audio signal at a value provided by multiplying a ratio of the predetermined frame rate to the reference frame rate by the sampling rate of the analog audio signal provided at the time of the imaging with the reference frame rate, at the time of the imaging by the solid-state imaging device with a predetermined frame rate different from the reference frame rate; and an audio encoding processing section for generating an audio stream by encoding audio data from the digital converting section, and then outputting the generated audio stream to the multiplexing processing section, wherein the multiplexing processing section multiplexes the audio stream together with the moving picture stream and the playback time control information.

11. A data processing apparatus for processing input data including moving picture data, comprising:

a moving picture input section for accepting input of the moving picture data allowing switching between a reference frame rate and more than one frame rate different from the reference frame rate in accordance with a desired timing;

a time control information generating section for generating playback time control information with certain intervals corresponding to picture frame display cycles relevant to the reference frame rate, for each picture frame inputted to the moving picture input section; and a time control information appending processing section for appending the playback time control information to the moving picture data having been inputted to the moving picture input section, in which the reference frame rate corresponds to a normal imaging mode and one of the more than one frame rate different from the reference frame rate corresponds to a fast imaging mode for imaging with a faster rate than that of the normal imaging mode, and in which during a recording operation when the normal imaging mode is utilized from a start time the playback time control information corresponds to real time information from the start time until the normal imaging mode is switched to the fast imaging mode whereupon the playback time control information corresponds to a time different from the real time and when the fast imaging mode switched back to the normal imaging mode the playback time control information is incremented so as to correspond to real time information added to the respective time different from the real time at the switch back from the fast imaging mode to the normal imaging mode, such that during a respective recording operation which involves the fast imaging mode a final value of the playback time control information corresponds to a total time which is different from a total recording time.

12. A stream generating method for generating a multiplexed stream including moving picture data, comprising the steps of:

causing a moving picture encoding processing section to generate a moving picture stream by encoding the moving picture data allowing switching between a reference frame rate and more than one frame rate different from the reference frame rate in accordance with a desired timing;

causing a time control information generating section to generate playback time control information with certain intervals corresponding to picture frame display cycles relevant to the reference frame rate, for each picture frame inputted to the moving picture encoding processing section; and causing a multiplexing processing section to generate the multiplexed stream by multiplexing the moving picture stream and the playback time control information, in which the reference frame rate corresponds to a normal imaging mode and one of the more than one frame rate different from the reference frame rate corresponds to a fast imaging mode for imaging with a faster rate than that of the normal imaging mode, and in which during a recording operation when the normal imaging mode is utilized from a start time the playback time control information corresponds to real time information from the start time until the normal imaging mode is switched to the fast imaging mode whereupon the playback time control information corresponds to a time different from the real time and when the fast imaging mode is switched back to the normal imaging mode the playback time control information is incremented so as to correspond to real time information added to the respective time different from the real time at the switch back from the fast imaging mode to the normal imaging mode, such that during a respective recording operation which involves the fast imaging mode a final value of the playback time control information corresponds to a total time which is different from a total recording time.

* * * * *